United States Patent
Taherzadeh Boroujeni et al.

(10) Patent No.: US 12,160,295 B2
(45) Date of Patent: Dec. 3, 2024

(54) TECHNIQUES FOR SCHEDULING OF CHANNEL STATE INFORMATION REFERENCE SIGNALS AND FEEDBACK DURING A RANDOM ACCESS CHANNEL OPERATION

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 131 days.

(21) Appl. No.: 16/949,500

(22) Filed: Oct. 30, 2020

(65) Prior Publication Data
US 2022/0140877 A1     May 5, 2022

(51) Int. Cl.
| | |
|---|---|
| *H04B 7/06* | (2006.01) |
| *H04B 7/0413* | (2017.01) |
| *H04L 5/00* | (2006.01) |
| *H04W 72/21* | (2023.01) |
| *H04W 74/0833* | (2024.01) |

(52) U.S. Cl.
CPC ......... *H04B 7/0626* (2013.01); *H04B 7/0413* (2013.01); *H04L 5/0048* (2013.01); *H04W 72/21* (2023.01); *H04W 74/0833* (2013.01)

(58) Field of Classification Search
CPC ..... H04L 5/0048; H04L 5/005; H04L 5/0094; H04L 1/0027; H04L 1/06; H04L 1/0026; H04W 74/0833; H04W 88/02; H04W 24/10; H04B 7/0626; H04B 7/00; H04B 7/0695

See application file for complete search history.

(56) References Cited

U.S. PATENT DOCUMENTS

| | | | |
|---|---|---|---|
| 2010/0184454 A1* | 7/2010 | Luft | H04W 48/02 455/422.1 |
| 2013/0022007 A1* | 1/2013 | Berggren | H04L 5/0053 370/329 |
| 2014/0092787 A1* | 4/2014 | Han | H04W 52/0212 370/280 |

(Continued)

FOREIGN PATENT DOCUMENTS

WO    WO-2018208216 A1    11/2018

OTHER PUBLICATIONS

International Search Report and Written Opinion—PCT/US2021/071662—ISA/EPO—Jan. 18, 2022.

*Primary Examiner* — Yee F Lam

(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may receive a channel state information (CSI) reference signal (CSI-RS) indication that indicates a set of resources corresponding to a CSI-RS that is scheduled to be transmitted to the UE. The UE may transmit, after receiving the CSI-RS indication, a UE identification message corresponding to a random access channel operation, wherein the UE identification message includes CSI feedback corresponding to the CSI-RS. Numerous other aspects are provided.

30 Claims, 8 Drawing Sheets

(56) References Cited

U.S. PATENT DOCUMENTS

| | | | |
|---|---|---|---|
| 2015/0049706 A1* | 2/2015 | Lee | H04L 5/0035 |
| | | | 370/329 |
| 2016/0212733 A1* | 7/2016 | Davydov | H04L 5/00 |
| 2018/0220345 A1* | 8/2018 | Moon | H04B 7/088 |
| 2018/0269939 A1* | 9/2018 | Hu | H04B 7/0626 |
| 2019/0141555 A1* | 5/2019 | Tooher | H04L 5/0057 |
| 2019/0215119 A1* | 7/2019 | Kim | H04L 5/0048 |
| 2019/0364599 A1 | 11/2019 | Islam et al. | |

* cited by examiner

TECHNIQUES FOR SCHEDULING OF CHANNEL STATE INFORMATION REFERENCE SIGNALS AND FEEDBACK DURING A RANDOM ACCESS CHANNEL OPERATION

FIELD OF THE DISCLOSURE

Aspects of the present disclosure generally relate to wireless communication and to techniques and apparatuses for techniques for scheduling of channel state information reference signals and feedback during a random access channel operation.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving a channel state information (CSI) reference signal (CSI-RS) indication that indicates a set of resources corresponding to a CSI-RS that is scheduled to be transmitted to the UE; and transmitting, after receiving the CSI-RS indication, a UE identification message corresponding to a random access channel (RACH) operation, wherein the UE identification message includes CSI feedback corresponding to the CSI-RS.

In some aspects, the method includes receiving a random access response (RAR) message that includes the CSI-RS indication.

In some aspects, the set of resources corresponding to the CSI-RS are explicitly scheduled by the RAR message.

In some aspects, the set of resources corresponding to the CSI-RS are implicitly indicated based at least in part on at least one of: a resource corresponding to the RAR message, a resource corresponding to the UE identification message, a rule defined in a wireless communication specification, or a value of a bitfield in the RAR message.

In some aspects, the RAR message includes a CSI feedback indication that indicates one or more resources corresponding to the CSI feedback.

In some aspects, the CSI feedback indication indicates at least one of: CSI to be included in the CSI feedback, or a parameter associated with the CSI feedback.

In some aspects, the CSI feedback is carried as uplink control information on a physical uplink shared channel.

In some aspects, the set of resources corresponding to the CSI-RS comprises at least one of: a time domain resource, or a frequency domain resource.

In some aspects, a method of wireless communication performed by a base station includes transmitting a CSI-RS indication that indicates a set of resources corresponding to a CSI-RS that is scheduled to be transmitted to a UE before transmission, by the UE, of a UE identification message corresponding to a RACH operation; and receiving the UE identification message, wherein the UE identification message includes CSI feedback corresponding to the CSI-RS.

In some aspects, the method includes transmitting an RAR message that includes the CSI-RS indication.

In some aspects, the set of resources corresponding to the CSI-RS are explicitly scheduled by the RAR message.

In some aspects, the set of resources corresponding to the CSI-RS are implicitly indicated based at least in part on at least one of: a resource corresponding to the RAR message, a resource corresponding to the UE identification message, a rule defined in a wireless communication specification, or a value of a bitfield in the RAR message.

In some aspects, the RAR message includes a CSI feedback indication that indicates one or more resources corresponding to the CSI feedback.

In some aspects, the CSI feedback indication indicates at least one of: CSI to be included in the CSI feedback, or a parameter associated with the CSI feedback.

In some aspects, the CSI feedback is carried as uplink control information on a physical uplink shared channel.

In some aspects, the set of resources corresponding to the CSI-RS comprises at least one of: a time domain resource, or a frequency domain resource.

In some aspects, a UE for wireless communication includes a memory and one or more processors operatively coupled to the memory, the memory and the one or more processors configured to receive a CSI-RS indication that indicates a set of resources corresponding to a CSI-RS that is scheduled to be transmitted to the UE; and transmit, after receiving the CSI-RS indication, a UE identification message corresponding to a RACH operation, wherein the UE identification message includes CSI feedback corresponding to the CSI-RS.

In some aspects, the one or more processors are further configured to receive an RAR message that includes the CSI-RS indication.

In some aspects, the set of resources corresponding to the CSI-RS are explicitly scheduled by the RAR message.

In some aspects, the set of resources corresponding to the CSI-RS are implicitly indicated based at least in part on at least one of: a resource corresponding to the RAR message, a resource corresponding to the UE identification message, a rule defined in a wireless communication specification, or a value of a bitfield in the RAR message.

In some aspects, the RAR message includes a CSI feedback indication that indicates one or more resources corresponding to the CSI feedback.

In some aspects, the CSI feedback indication indicates at least one of: CSI to be included in the CSI feedback, or a parameter associated with the CSI feedback.

In some aspects, the CSI feedback is carried as uplink control information on a physical uplink shared channel.

In some aspects, the set of resources corresponding to the CSI-RS comprises at least one of: a time domain resource, or a frequency domain resource.

In some aspects, a base station for wireless communication includes a memory and one or more processors operatively coupled to the memory, the memory and the one or more processors configured to: transmit a CSI-RS indication that indicates a set of resources corresponding to a CSI-RS that is scheduled to be transmitted to a UE before transmission of a UE identification message corresponding to a RACH operation; and receive the UE identification message, wherein the UE identification message includes CSI feedback corresponding to the CSI-RS.

In some aspects, the one or more processors are further configured to transmit an RAR message that includes the CSI-RS indication.

In some aspects, the set of resources corresponding to the CSI-RS are explicitly scheduled by the RAR message.

In some aspects, the set of resources corresponding to the CSI-RS are implicitly indicated based at least in part on at least one of: a resource corresponding to the RAR message, a resource corresponding to the UE identification message, a rule defined in a wireless communication specification, or a value of a bitfield in the RAR message.

In some aspects, the RAR message includes a CSI feedback indication that indicates one or more resources corresponding to the CSI feedback.

In some aspects, the CSI feedback is carried as uplink control information on a physical uplink shared channel.

In some aspects, the set of resources corresponding to the CSI-RS comprises at least one of: a time domain resource, or a frequency domain resource.

In some aspects, the CSI feedback indication indicates at least one of: CSI to be included in the CSI feedback, or a parameter associated with the CSI feedback.

In some aspects, a non-transitory computer-readable medium storing a set of instructions for wireless communication includes one or more instructions that, when executed by one or more processors of a UE, cause the UE to receive a CSI-RS indication that indicates a set of resources corresponding to a CSI-RS that is scheduled to be transmitted to the UE; and transmit, after receiving the CSI-RS indication, a UE identification message corresponding to a RACH operation, wherein the UE identification message includes CSI feedback corresponding to the CSI-RS.

In some aspects, the one or more instructions further cause the UE to receive an RAR message that includes the CSI-RS indication.

In some aspects, the set of resources corresponding to the CSI-RS are explicitly scheduled by the RAR message.

In some aspects, the set of resources corresponding to the CSI-RS are implicitly indicated based at least in part on at least one of: a resource corresponding to the RAR message, a resource corresponding to the UE identification message, a rule defined in a wireless communication specification, or a value of a bitfield in the RAR message.

In some aspects, the RAR message includes a CSI feedback indication that indicates one or more resources corresponding to the CSI feedback.

In some aspects, the CSI feedback indication indicates at least one of: CSI to be included in the CSI feedback, or a parameter associated with the CSI feedback.

In some aspects, the CSI feedback is carried as uplink control information on a physical uplink shared channel.

In some aspects, the set of resources corresponding to the CSI-RS comprises at least one of: a time domain resource, or a frequency domain resource.

In some aspects, a non-transitory computer-readable medium storing a set of instructions for wireless communication includes one or more instructions that, when executed by one or more processors of a base station, cause the base station to: transmit a CSI-RS indication that indicates a set of resources corresponding to a CSI-RS that is scheduled to be transmitted to a UE before transmission of a UE identification message corresponding to a RACH operation; and receive the UE identification message, wherein the UE identification message includes CSI feedback corresponding to the CSI-RS.

In some aspects, the one or more instructions further cause the base station to transmit an RAR message that includes the CSI-RS indication.

In some aspects, the set of resources corresponding to the CSI-RS are explicitly scheduled by the RAR message.

In some aspects, the set of resources corresponding to the CSI-RS are implicitly indicated based at least in part on at least one of: a resource corresponding to the RAR message, a resource corresponding to the UE identification message, a rule defined in a wireless communication specification, or a value of a bitfield in the RAR message.

In some aspects, the RAR message includes a CSI feedback indication that indicates one or more resources corresponding to the CSI feedback.

In some aspects, the CSI feedback indication indicates at least one of: CSI to be included in the CSI feedback, or a parameter associated with the CSI feedback.

In some aspects, the CSI feedback is carried as uplink control information on a physical uplink shared channel.

In some aspects, the set of resources corresponding to the CSI-RS comprises at least one of: a time domain resource, or a frequency domain resource.

In some aspects, an apparatus for wireless communication includes means for receiving a CSI-RS indication that indicates a set of resources corresponding to a CSI-RS that is scheduled to be transmitted to the apparatus; and means for transmitting, after receiving the CSI-RS indication, a UE identification message corresponding to a RACH operation, wherein the UE identification message includes CSI feedback corresponding to the CSI-RS.

In some aspects, the apparatus includes means for receiving an RAR message that includes the CSI-RS indication.

In some aspects, the set of resources corresponding to the CSI-RS are explicitly scheduled by the RAR message.

In some aspects, the set of resources corresponding to the CSI-RS are implicitly indicated based at least in part on at least one of: a resource corresponding to the RAR message, a resource corresponding to the UE identification message, a rule defined in a wireless communication specification, or a value of a bitfield in the RAR message.

In some aspects, the RAR message includes a CSI feedback indication that indicates one or more resources corresponding to the CSI feedback.

In some aspects, the CSI feedback indication indicates at least one of: CSI to be included in the CSI feedback, or a parameter associated with the CSI feedback.

In some aspects, the CSI feedback is carried as uplink control information on a physical uplink shared channel.

In some aspects, the set of resources corresponding to the CSI-RS comprises at least one of: a time domain resource, or a frequency domain resource.

In some aspects, an apparatus for wireless communication includes means for transmitting a CSI-RS indication that indicates a set of resources corresponding to a CSI-RS that is scheduled to be transmitted to a UE before transmission of a UE identification message corresponding to a RACH operation; and means for receiving the UE identification message, wherein the UE identification message includes CSI feedback corresponding to the CSI-RS.

In some aspects, the apparatus includes means for transmitting an RAR message that includes the CSI-RS indication.

In some aspects, the set of resources corresponding to the CSI-RS are explicitly scheduled by the RAR message.

In some aspects, the set of resources corresponding to the CSI-RS are implicitly indicated based at least in part on at least one of: a resource corresponding to the RAR message, a resource corresponding to the UE identification message, a rule defined in a wireless communication specification, or a value of a bitfield in the RAR message.

In some aspects, the RAR message includes a CSI feedback indication that indicates one or more resources corresponding to the CSI feedback.

In some aspects, the CSI feedback indication indicates at least one of: CSI to be included in the CSI feedback, or a parameter associated with the CSI feedback.

In some aspects, the CSI feedback is carried as uplink control information on a physical uplink shared channel.

In some aspects, the set of resources corresponding to the CSI-RS comprises at least one of: a time domain resource, or a frequency domain resource.

In some aspects, a method, device, apparatus, computer program product, non-transitory computer-readable medium, user equipment, base station, node, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
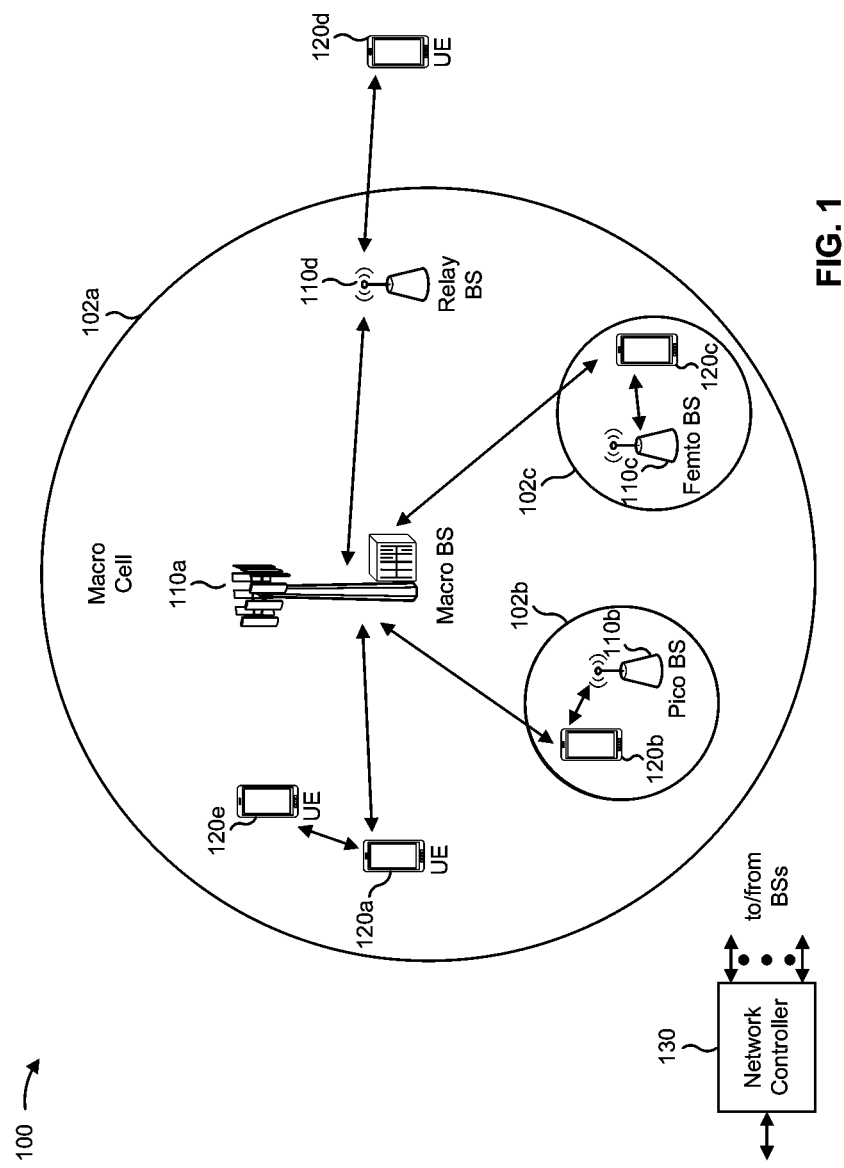
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
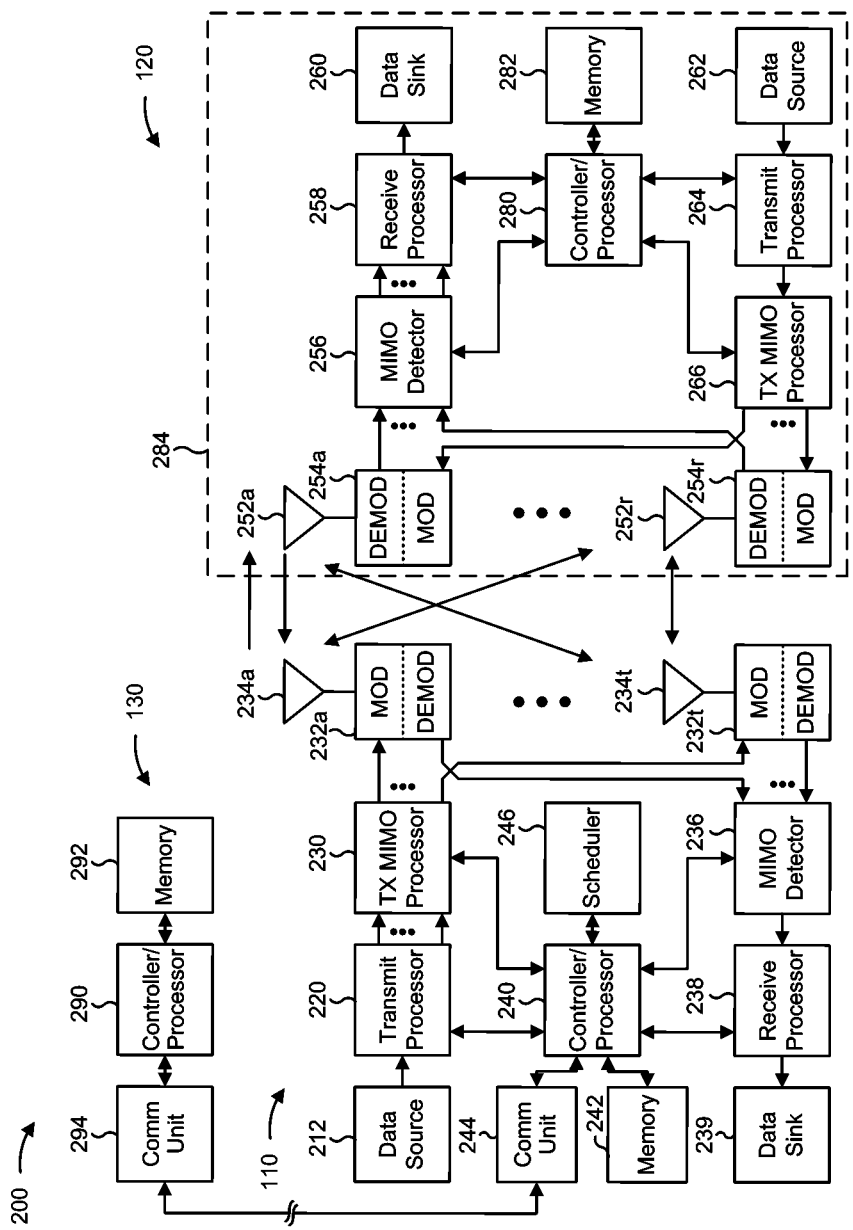
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with techniques for scheduling of channel state information (CSI) reference signals (RSs) and feedback during a random access channel (RACH) operation, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, interpreting the instructions, and/or the like.

In some aspects, UE 120 may include means for receiving a CSI-RS indication that indicates a set of resources corresponding to a CSI-RS that is scheduled to be transmitted to the UE, means for transmitting, after receiving the CSI-RS indication, a UE identification message corresponding to a RACH operation, wherein the UE identification message includes CSI feedback corresponding to the CSI-RS, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting a CSI-RS indication that indicates a set of resources corresponding to a CSI-RS that is scheduled to be transmitted to a UE before transmission, by the UE, of a UE identification message corresponding to a RACH operation, means for receiving the UE identification message, wherein the UE identification message includes CSI feedback corresponding to the CSI-RS, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
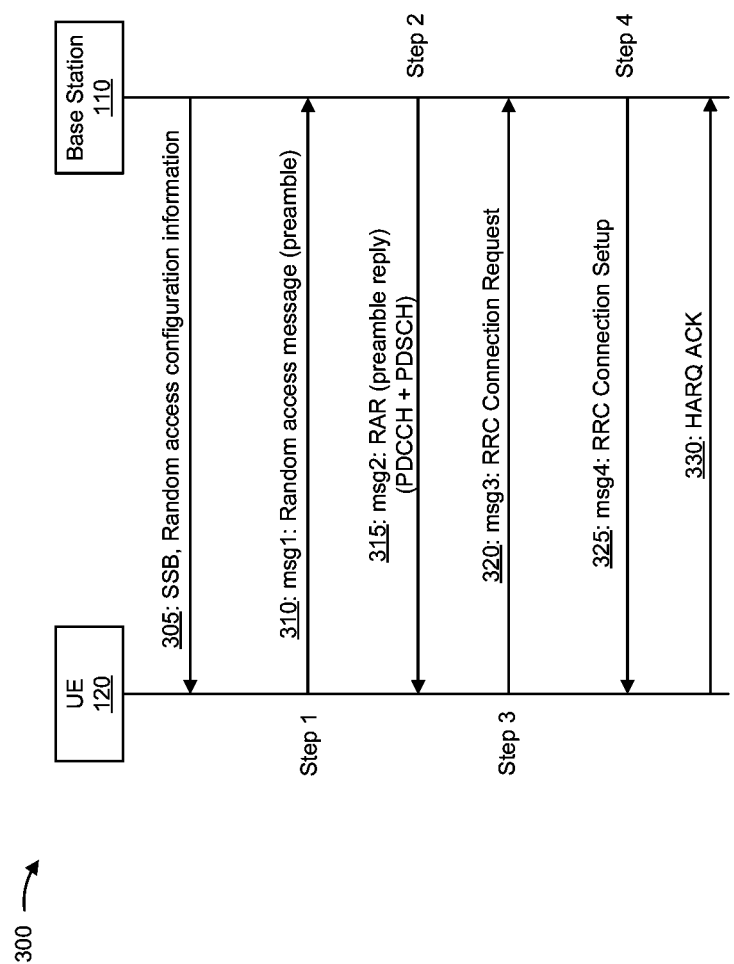
FIG. 3 is a diagram illustrating an example of a four-step random access procedure, in accordance with various aspects of the present disclosure.

FIG. 3 is a diagram illustrating an example of a four-step RACH operation, in accordance with various aspects of the present disclosure. As shown in FIG. 3, a base station 110 and a UE 120 may communicate with one another to perform the four-step random access procedure.

As shown by reference number 305, the base station 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs) and/or the like) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the random access procedure, such as one or more parameters for transmitting a random access message (RAM), one or more parameters for receiving an random access response (RAR), and/or the like.

As shown by reference number 310, the UE 120 may transmit a RAM with a RACH request via a physical random access channel (PRACH). The RAM may include a preamble (sometimes referred to as a random access preamble, a PRACH preamble, a RAM preamble, and/or the like). The message that includes the preamble may be referred to as a message 1, msg1, MSG1, a first message, an initial message, and/or the like in a four-step random access procedure. The random access message may include a random access preamble identifier.

As shown by reference number 315, the base station 110 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step random access procedure, the base station 110 may transmit a PDCCH communication for the RAR. The PDCCH communication may schedule a physical downlink shared channel (PDSCH) communication that includes the RAR. For example, the PDCCH communication may indicate a resource allocation for the PDSCH communication. Also as part of the second step of the four-step random access procedure, the base station 110 may transmit the PDSCH communication for the RAR, as scheduled by the PDCCH communication. The RAR may be included in a MAC PDU of the PDSCH communication.

As shown by reference number 320, the UE 120 may transmit an RRC connection request message. The RRC connection request message may be referred to as message 3, msg3, MSG3, a UE identification message, or a third message of a four-step random access procedure. In some aspects, the RRC connection request may include a UE identifier, UCI, a physical uplink shared channel (PUSCH) communication (e.g., an RRC connection request), and/or the like.

As shown by reference number 325, the base station 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, contention resolution information, and/or the like. As shown by reference number 330, if the UE 120 successfully receives the RRC connection setup message, the UE 120 may transmit a hybrid automatic repeat request acknowledgement (HARQ-ACK).

As indicated above, FIG. 3 is provided as an example. Other examples may differ from what is described with regard to FIG. 3.

RACH operations may have coverage limitations, which may cause negative impacts on network performance. In some cases, RACH messages at frequency ranges of greater than or equal to about 24 Gigahertz may be missed by UEs or inaccurately decoded by UEs. As a result, RRC connection setup messages may not be transmitted effectively, compromising network connection.

Aspects of techniques described herein may facilitate beam refinement during RACH operations. For example, aspects may enable a base station to schedule, before a UE identification message is transmitted, a CSI-RS. In this way, the UE may receive the CSI-RS and provide CSI feedback in the UE identification message. Thus, aspects may enable beam refinement during the RACH operation, which may result in coverage enhancement for RRC connection, which may positively impact network performance.

Figure 4:
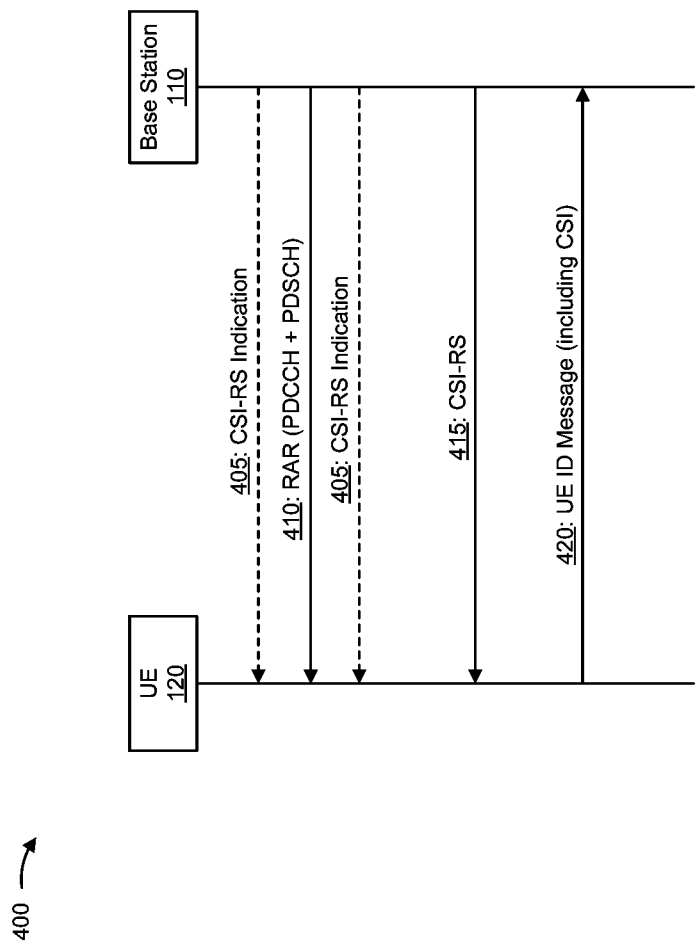
FIG. 4 is a diagram illustrating an example associated with techniques for scheduling of channel state information (CSI) reference signals (RSs) and feedback during a random access channel (RACH) operation, in accordance with various aspects of the present disclosure.

FIG. 4 is a diagram illustrating an example 400 associated with techniques for scheduling of CSI-RSs and feedback during a RACH operation, in accordance with various aspects of the present disclosure. As shown in FIG. 4, a base station 110 and a UE 120 may communicate with one another.

As shown by reference number 405, the base station 110 may transmit, and the UE 120 may receive, a CSI-RS indication. The CSI-RS indication may indicate a set of resources corresponding to a CSI-RS that is scheduled to be transmitted to the UE 120 before transmission, by the UE 120, of a UE identification message corresponding to a RACH operation. The set of resources corresponding to the CSI-RS may include time domain resources and/or frequency domain resources. In some aspects, the CSI feedback indication also may indicate a CSI report that the UE 120 is to transmit as part of a PUSCH portion of a UE identification message. The CSI feedback indication may additionally, or alternatively, indicate a configuration for the CSI report, CSI parameters that the UE is to transmit, and/or the like.

As shown by reference number 410, the base station 110 may transmit, and the UE 120 may receive, an RAR message corresponding to the RACH operation. As indicated by the dashed arrows, the base station 110 may transmit the CSI-RS indication prior to transmitting the RAR message corresponding to the RACH operation or after transmitting the RAR message.

In some aspects, the RAR message may include the CSI-RS indication. In some aspects, the set of resources corresponding to the CSI-RS may be explicitly scheduled by the RAR message. In some aspects, the set of resources corresponding to the CSI-RS may be implicitly indicated by the RAR message. For example, the set of resources may be implicitly indicated based at least in part on at least one of: a resource corresponding to the RAR message, a resource corresponding to the UE identification message, a rule defined in a wireless communication specification, or a value of a bitfield in the RAR message.

As shown by reference number 415, the base station 110 may transmit, and the UE 120 may receive, the CSI-RS. As shown by reference number 420, the UE 120 may transmit, and the base station 110 may receive, a UE identification message corresponding to the RACH operation. The UE identification message may include CSI feedback corresponding to the CSI-RS. In some aspects, the CSI feedback may be carried in a PUSCH portion of the UE identification message. In some aspects, the CSI feedback may be carried as uplink control information (UCI) on a PUSCH. For example, the CSI feedback may be structured according to a UCI on a PUSCH structure specified in a wireless communication standard.

According to aspects of the techniques discussed above, CSI-RS scheduling for beam refinement may be performed after a RACH operation has begun and before a UE identification message is transmitted. In this way, aspects may enable coverage enhancements associated with beam refinement during a RACH operation, which may positively impact network performance.

As indicated above, FIG. 4 is provided as an example. Other examples may differ from what is described with respect to FIG. 4.

Figure 5:
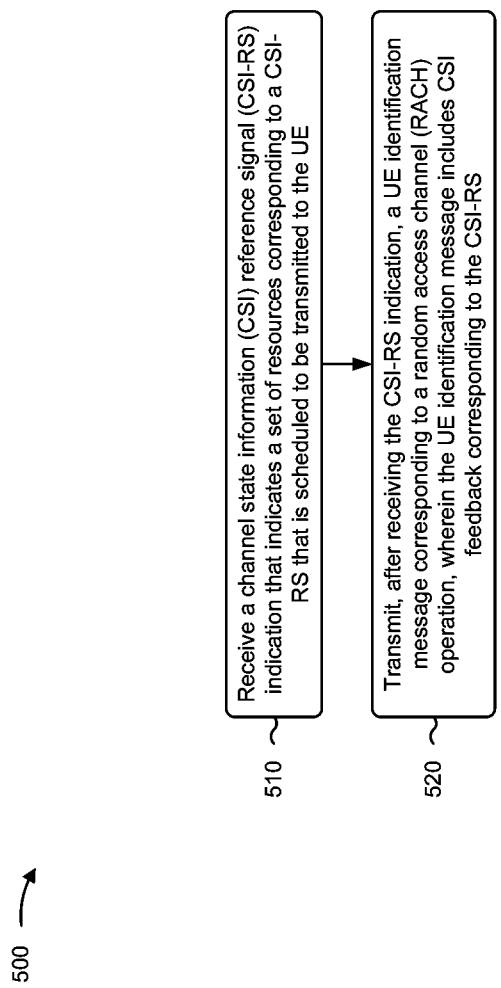
FIGS. 5 and 6 are diagrams illustrating example processes associated with techniques for scheduling of CSI-RSs and feedback during a RACH operation, in accordance with various aspects of the present disclosure.

FIG. 5 is a diagram illustrating an example process 500 performed, for example, by a UE, in accordance with various aspects of the present disclosure. Example process 500 is an example where the UE (e.g., UE 120) performs operations associated with techniques for scheduling of CSI-RSs and feedback during a RACH operation.

As shown in FIG. 5, in some aspects, process 500 may include receiving a CSI-RS indication that indicates a set of resources corresponding to a CSI-RS that is scheduled to be transmitted to the UE (block 510). For example, the UE (e.g., using reception component 702, depicted in FIG. 7) may receive a CSI-RS indication that indicates a set of resources corresponding to a CSI-RS that is scheduled to be transmitted to the UE, as described above.

As further shown in FIG. 5, in some aspects, process 500 may include transmitting, after receiving the CSI-RS indication, a UE identification message corresponding to a RACH operation, wherein the UE identification message includes CSI feedback corresponding to the CSI-RS (block 520). For example, the UE (e.g., using transmission component 704, depicted in FIG. 7) may transmit, after receiving the CSI-RS indication, a UE identification message corresponding to a RACH operation, wherein the UE identification message includes CSI feedback corresponding to the CSI-RS, as described above.

Process 500 may include additional aspects, such as any single aspect or any combination of aspects described below and/or in connection with one or more other processes described elsewhere herein.

In a first aspect, process 500 includes receiving a random access response (RAR) message that includes the CSI-RS indication.

In a second aspect, alone or in combination with the first aspect, the set of resources corresponding to the CSI-RS are explicitly scheduled by the RAR message.

In a third aspect, alone or in combination with the first aspect, the set of resources corresponding to the CSI-RS are implicitly indicated based at least in part on at least one of a resource corresponding to the RAR message, a resource corresponding to the UE identification message, a rule defined in a wireless communication specification, or a value of a bitfield in the RAR message.

In a fourth aspect, alone or in combination with one or more of the first through third aspects, the RAR message includes a CSI feedback indication that indicates one or more resources corresponding to the CSI feedback.

In a fifth aspect, alone or in combination with one or more of the first through fourth aspects, the CSI feedback indication indicates at least one of CSI to be included in the CSI feedback, or a parameter associated with the CSI feedback.

In a sixth aspect, the CSI feedback is carried as uplink control information on a physical uplink shared channel.

In a seventh aspect, alone or in combination with one or more of the first through sixth aspects, the set of resources corresponding to the CSI-RS comprises at least one of a time domain resource, or a frequency domain resource.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
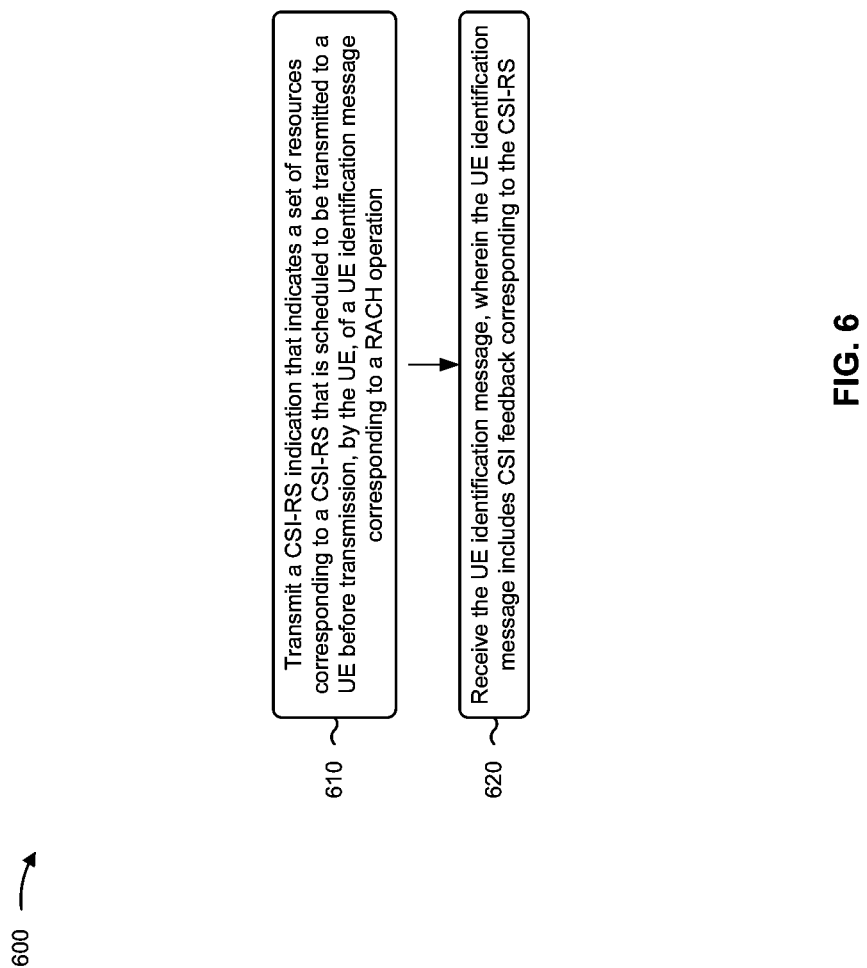

FIG. 6 is a diagram illustrating an example process 600 performed, for example, by a base station, in accordance with various aspects of the present disclosure. Example process 600 is an example where the base station (e.g., base station 110) performs operations associated with techniques for scheduling of CSI-RSs and feedback during a RACH operation.

As shown in FIG. 6, in some aspects, process 600 may include transmitting a CSI-RS indication that indicates a set of resources corresponding to a CSI-RS that is scheduled to be transmitted to a UE before transmission of a UE identification message corresponding to a RACH operation (block 610). For example, the base station (e.g., using transmission component 804, depicted in FIG. 8) may transmit a CSI-RS indication that indicates a set of resources corresponding to a CSI-RS that is scheduled to be transmitted to a UE before transmission of a UE identification message corresponding to a RACH operation, as described above.

As further shown in FIG. 6, in some aspects, process 600 may include receiving the UE identification message, wherein the UE identification message includes CSI feedback corresponding to the CSI-RS (block 620). For example, the base station (e.g., using reception component 802, depicted in FIG. 8) may receive the UE identification message, wherein the UE identification message includes CSI feedback corresponding to the CSI-RS, as described above.

Process 600 may include additional aspects, such as any single aspect or any combination of aspects described below and/or in connection with one or more other processes described elsewhere herein.

In a first aspect, process 600 includes transmitting an RAR message that includes the CSI-RS indication.

In a second aspect, alone or in combination with the first aspect, the set of resources corresponding to the CSI-RS are explicitly scheduled by the RAR message.

In a third aspect, alone or in combination with the first aspect, the set of resources corresponding to the CSI-RS are implicitly indicated based at least in part on at least one of a resource corresponding to the RAR message, a resource corresponding to the UE identification message, a rule defined in a wireless communication specification, or a value of a bitfield in the RAR message.

In a fourth aspect, alone or in combination with one or more of the first through third aspects, the RAR message includes a CSI feedback indication that indicates one or more resources corresponding to the CSI feedback.

In a fifth aspect, alone or in combination with one or more of the first through fourth aspects, the CSI feedback indication indicates at least one of CSI to be included in the CSI feedback, or a parameter associated with the CSI feedback.

In a sixth aspect, the CSI feedback is carried as uplink control information on a physical uplink shared channel.

In a seventh aspect, alone or in combination with one or more of the first through sixth aspects, the set of resources corresponding to the CSI-RS comprises at least one of a time domain resource, or a frequency domain resource.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
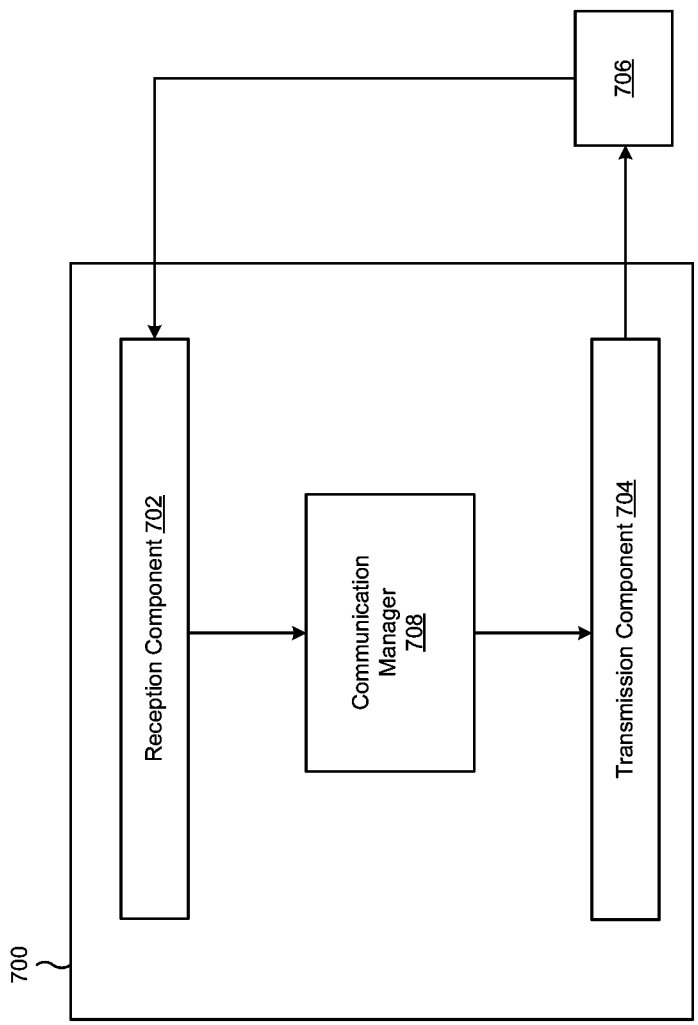
FIGS. 7 and 8 are block diagrams of example apparatuses for wireless communication, in accordance with various aspects of the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a communication manager 708, among other examples. The communication manager 708 may facilitate determining CSI-RS parameters and/or resources based on implicit indications thereof, measurement of CSI, selection of refined beams, and/or the like.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The reception component 702 may receive a CSI-RS indication that indicates a set of resources corresponding to a CSI-RS that is scheduled to be transmitted to the UE. The transmission component 704 may transmit, after receiving the CSI-RS indication, a UE identification message corresponding to a RACH operation, where the UE identification message may include CSI feedback corresponding to the CSI-RS. The reception component 702 may receive an RAR message that includes the CSI-RS indication. The reception component 702 may receive the CSI-RS.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

Figure 8:
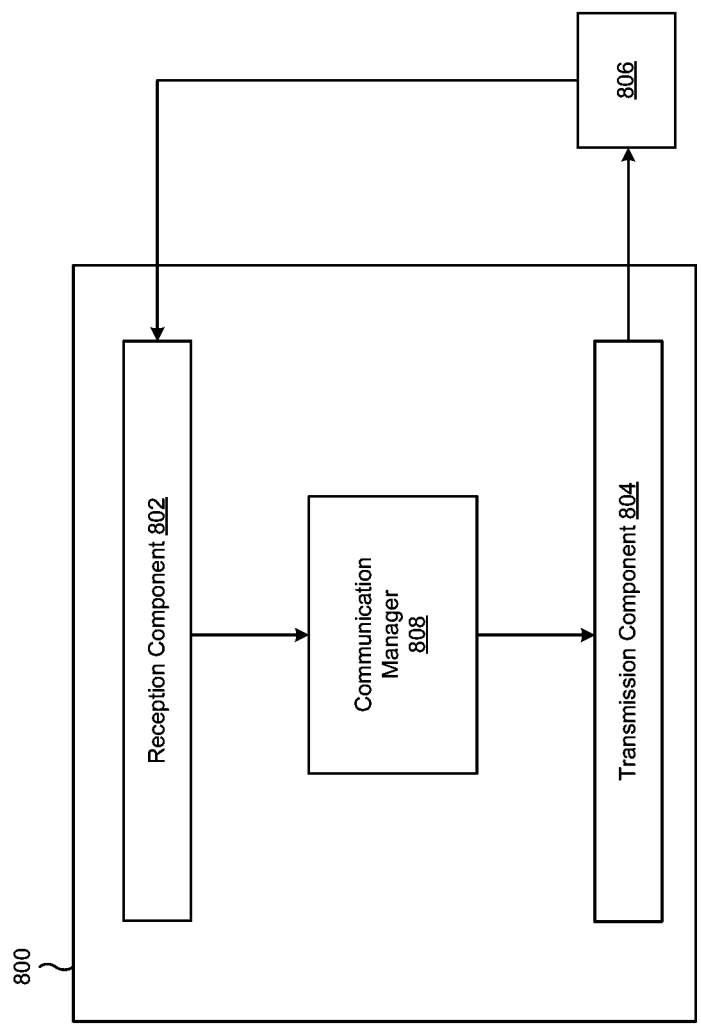

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808 that may facilitate one or more beam refinement operations based at least in part on CSI feedback received from a UE.

In some aspects, the apparatus 800 may be configured to perform one or more operations described herein in connection with FIG. 4. Additionally or alternatively, the apparatus 800 may be configured to perform one or more processes described herein, such as process 600 of FIG. 6. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

The transmission component 804 may transmit a CSI-RS indication that indicates a set of resources corresponding to a CSI-RS that is scheduled to be transmitted to a UE before transmission of a UE identification message corresponding to a RACH operation. The reception component 802 may receive the UE identification message, wherein the UE identification message includes CSI feedback corresponding to the CSI-RS. The transmission component 804 may transmit RAR message that includes the CSI-RS indication. The transmission component 804 may transmit the CSI-RS.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, as a second message associated with a random access procedure, a random access response (RAR) message,
   wherein the RAR message includes:
      a channel state information (CSI)-reference signal (CSI-RS) indication that indicates a set of resources corresponding to a CSI-RS that is scheduled to be transmitted to the UE before transmission of a UE identification message, wherein the set of resources corresponding to the CSI-RS are indicated implicitly based at least in part on a resource corresponding to the UE identification message, and
      a CSI feedback indication that indicates one or more resources associated with transmission of CSI feedback during a third message associated with the random access procedure;
   receiving the CSI-RS after receiving the RAR message; and
   transmitting, after receiving the CSI-RS and as the third message associated with the random access procedure, the UE identification message,
      wherein the UE identification message includes the CSI feedback, and
      wherein the CSI feedback corresponds to the CSI-RS.

2. The method of claim 1, wherein the set of resources corresponding to the CSI-RS are implicitly indicated based at least in part on a value of a bitfield in the RAR message.

3. The method of claim 1, wherein the CSI feedback indication indicates at least one of:
   CSI to be included in the CSI feedback, or
   a parameter associated with the CSI feedback.

4. The method of claim 1, wherein the CSI feedback is carried as uplink control information on a physical uplink shared channel.

5. The method of claim 1, wherein the set of resources corresponding to the CSI-RS are implicitly indicated based at least in part on a rule defined in a wireless communication.

6. The method of claim 1, wherein the set of resources corresponding to the CSI-RS are implicitly indicated based at least in part on a resource corresponding to the RAR message.

7. The method of claim 1, wherein the set of resources corresponding to the CSI-RS comprises at least one of: a time domain resource, or a frequency domain resource.

8. The method of claim 1, further comprising:
   receiving a physical downlink control channel (PDCCH) scheduling the RAR message.

9. The method of claim 8, wherein the PDCCH schedules the RAR message in a physical downlink shared channel (PDSCH) communication.

10. The method of claim 9, wherein the PDCCH comprises a resource allocation for the PDSCH communication.

11. A user equipment (UE) for wireless communication, comprising:
   one or more memories; and
   one or more processors coupled to the one or more memories, the one or more processors configured to:
      receive, as a second message associated with a random access procedure, a random access response (RAR) message, wherein the RAR message includes:
  a channel state information (CSI)-reference signal (CSI-RS) indication that indicates a set of resources corresponding to a CSI-RS that is scheduled to be transmitted to the UE before transmission of a UE identification message, wherein the set of resources corresponding to the CSI-RS are implicitly indicated based at least in part on a resource corresponding to the UE identification message, and
  a CSI feedback indication that indicates one or more resources associated with transmission of CSI feedback during a third message associated with the random access procedure;
receive the CSI-RS after the RAR message is received; and
transmit, after the CSI-RS is received and as the third message associated with the random access procedure, the UE identification message,
  wherein the UE identification message includes the CSI feedback, and
  wherein the CSI feedback corresponds to the CSI-RS.

12. The UE of claim 11, wherein the set of resources corresponding to the CSI-RS are implicitly indicated based at least in part on a value of a bitfield in the RAR message.

13. The UE of claim 11, wherein the CSI feedback indication indicates at least one of:
  CSI to be included in the CSI feedback, or
  a parameter associated with the CSI feedback.

14. The UE of claim 11, wherein the CSI feedback is carried as uplink control information on a physical uplink shared channel.

15. The UE of claim 11, wherein the set of resources corresponding to the CSI-RS are implicitly indicated based at least in part on a rule defined in a wireless communication specification.

16. The UE of claim 11, wherein the set of resources corresponding to the CSI-RS are implicitly indicated based at least in part on a resource corresponding to the RAR message.

17. The UE of claim 11, wherein the set of resources corresponding to the CSI-RS comprises at least one of: a time domain resource, or a frequency domain resource.

18. The UE of claim 11, wherein the one or more processors are further configured to:
  receive a physical downlink control channel (PDCCH) scheduling the RAR message.

19. The UE of claim 18, wherein the PDCCH schedules the RAR message in a physical downlink shared channel (PDSCH) communication.

20. The UE of claim 19, wherein the PDCCH comprises a resource allocation for the PDSCH communication.

21. A non-transitory computer-readable medium storing a set of instructions for wireless communication, the set of instructions comprising:
  one or more instructions that, when executed by one or more processors of a user equipment (UE), cause the UE to:
    receive, as a second message associated with a random access procedure, a random access response (RAR) message,
    wherein the RAR message includes:
      a channel state information (CSI)-reference signal (CSI-RS) indication that indicates a set of resources corresponding to a CSI-RS that is scheduled to be transmitted to the UE before transmission of a UE identification message, wherein the set of resources corresponding to the CSI-RS are implicitly indicated based at least in part on a resource corresponding to the UE identification message, and
      a CSI feedback indication that indicates one or more resources associated with transmission of CSI feedback during a third message associated with the random access procedure;
    receive the CSI-RS after the RAR message is received; and
    transmit, after the CSI-RS is received and as the third message associated with the random access procedure, the UE identification message,
      wherein the UE identification message includes the CSI feedback, and
      wherein the CSI feedback corresponds to the CSI-RS.

22. The non-transitory computer-readable medium of claim 21, wherein the CSI feedback is carried as uplink control information on a physical uplink shared channel.

23. The non-transitory computer-readable medium of claim 21, wherein the set of resources corresponding to the CSI-RS are implicitly indicated based at least in part on a value of a bitfield in the RAR message.

24. The non-transitory computer-readable medium of claim 21, wherein the set of resources corresponding to the CSI-RS are based at least in part on a rule defined in a wireless communication specification.

25. The non-transitory computer-readable medium of claim 21, wherein the CSI feedback indication indicates at least one of:
  CSI to be included in the CSI feedback, or
  a parameter associated with the CSI feedback.

26. The non-transitory computer-readable medium of claim 21, wherein the set of resources corresponding to the CSI-RS are implicitly indicated based at least in part on a resource corresponding to the RAR message.

27. The non-transitory computer-readable medium of claim 21, wherein the set of resources corresponding to the CSI-RS comprises at least one of: a time domain resource, or a frequency domain resource.

28. The non-transitory computer-readable medium of claim 21, wherein the one or more instructions further cause the UE to:
  receive a physical downlink control channel (PDCCH) scheduling the RAR message.

29. The non-transitory computer-readable medium of claim 28, wherein the PDCCH schedules the RAR message in a physical downlink shared channel (PDSCH) communication, and wherein the PDCCH comprises a resource allocation for the PDSCH communication.

30. An apparatus for wireless communication, comprising:
  means for receiving, as a second message associated with a random access procedure, a random access response (RAR) message,
    wherein the RAR message includes:
      a channel state information (CSI)-reference signal (CSI-RS) indication that indicates a set of resources corresponding to a CSI-RS that is scheduled to be transmitted to the apparatus before transmission of a UE identification message, wherein the set of resources corresponding to the CSI-RS are indicated implicitly based at least in part on a resource corresponding to the UE identification message, and a CSI feedback indication that indicates one or more resources associated with transmission of CSI feedback during a third message associated with the random access procedure;
means for receiving the CSI-RS after receiving the RAR message; and
means for transmitting, after receiving the CSI-RS and as the third message associated with the random access procedure, the UE identification message,
wherein the UE identification message includes the CSI feedback, and
wherein the CSI feedback corresponds to the CSI-RS.

\* \* \* \* \*